United States Patent [19]

Munsterer

[11] Patent Number: 5,247,816
[45] Date of Patent: Sep. 28, 1993

[54] LOCKING MEANS, FOR A FAUCET

[76] Inventor: Gerald Munsterer, 390 Route 15 South, Wharton, N.J. 07885

[21] Appl. No.: 944,200

[22] Filed: Sep. 11, 1992

[51] Int. Cl.$^5$ ............................................. F16B 41/00
[52] U.S. Cl. ..................................... 70/232; 137/358
[58] Field of Search .......... 70/230, 231, 232, 175–180; 137/383, 385

[56] References Cited

U.S. PATENT DOCUMENTS

| 918,002 | 4/1909 | Butchart | 70/175 |
| 1,477,808 | 12/1923 | Costello | 70/180 |
| 4,397,332 | 8/1983 | Sample | 70/177 |
| 4,516,414 | 5/1985 | Woolvin | 70/180 |
| 5,176,014 | 1/1993 | Erickson | 70/232 |

FOREIGN PATENT DOCUMENTS

| 26902 | 2/1902 | Switzerland | 137/383 |
| 2098704 | 11/1982 | United Kingdom | 137/385 |

Primary Examiner—Peter M. Cuomo
Assistant Examiner—Darnell M. Boucher
Attorney, Agent, or Firm—Bernard J. Murphy

[57] ABSTRACT

A plate, having a centrally located, tapped hole, which extends only about half-way into the plate, seats a fluid seal therein. The tapped hole threadedly engages the externally-threaded nozzle of a faucet to close off the faucet. The plate further has a plurality of further, throughgoing holes formed therein, spaced apart forty-five degrees of arc, about a common radius from the radial center of the tapped hole. A shackle of a padlock is passed through a given one of the plurality of throughgoing holes, which is (a) closest to the bonnet, stem and handle of the faucet, and (b) would be the first to pass under the faucet, if the plate were to be unscrewed therefrom, and the shackle is locked into the body of the padlock. The padlock is so positioned that it will impact with the faucet, if the plate is turned, to prevent withdrawal of the plate from the faucet.

2 Claims, 1 Drawing Sheet

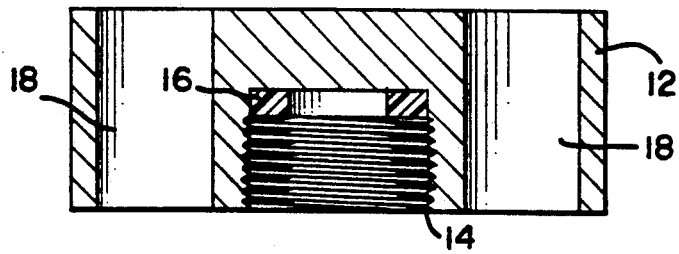
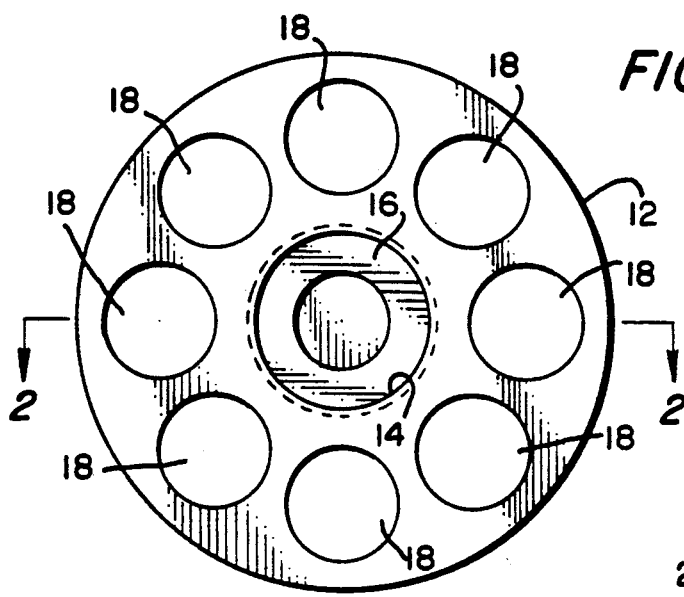
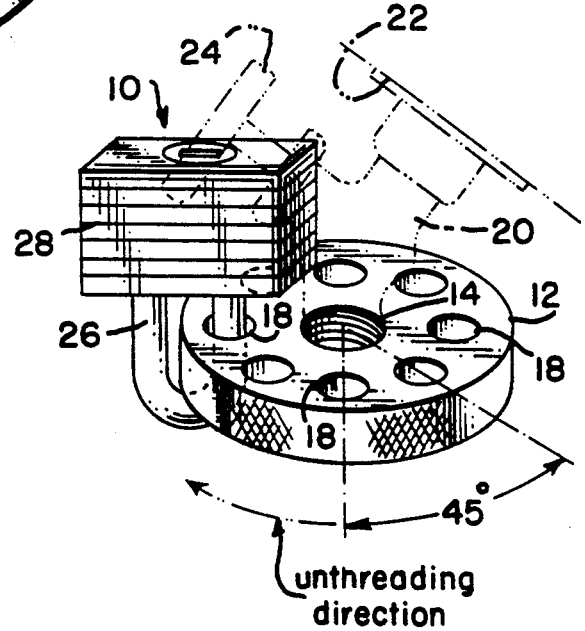
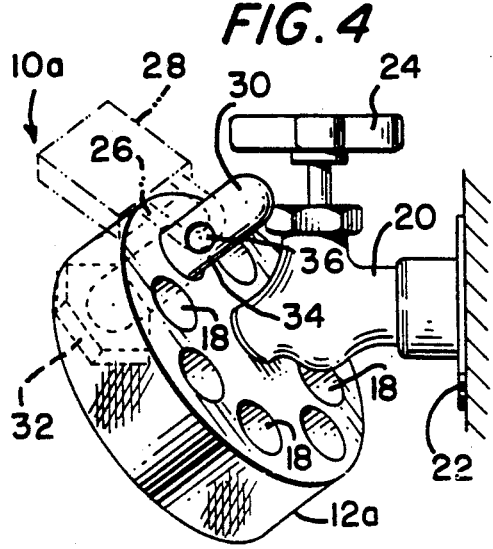

LOCKING MEANS, FOR A FAUCET

This invention pertains to locking devices, and in particular to a novel locking means for a faucet which has an externally-threaded nozzle.

Residences, commonly, have faucets mounted externally thereof to accommodate an attachment thereto of watering hoses. Too, commercial and/or industrial facilities have fuel and lubricant tanks fitted with faucets for the drawing of the contents, and typically such tanks are unattended for extended periods of time.

If the residences have internal shut-offs, there obtains the option of using such to prevent a theft of water from the external faucet. However, it is a great inconvenience having to go through such an exercise to guard against an unauthorized use of water. Too, there are residences, notably in the state of Florida, where internal shut-offs are not available. Consequently, in the absence of the owner of the residence, the theft of water, lately a scarce and expensive resource, from the external faucet is an outstanding problem. Similarly, theft of gasoline, kerosine, lubricating oil, or the like, from such aforesaid unattended commercial or industrial, fauceted tanks, is a same, unmet problem.

It is an object of this invention to set forth a means for solving the cited problem. Particularly, it is an object of this invention to disclose a locking means, for a faucet having an externally-threaded nozzle, comprising first means, threadedly engageable with the externally-threaded nozzle of a faucet, for sealingly closing off said nozzle; and second means for (a) lockingly engaging said first means, and (b) impacting a portion of such faucet, in response to a limited unthreading of said first means from such nozzle, to prevent threaded disengagement of said first means from said nozzle.

Further objects of this invention, as well as the novel features thereof, will be apparent from the following description, taken in conjunction with the accompanying figures, in which:

FIG. 1 is a plan view of the locking plate employed in a first embodiment of the invention;

FIG. 2 is a cross-sectional view taken along section 2—2 of FIG. 1;

FIG. 3 is a perspective illustration of the first embodiment of the invention shown in position on a phantomed faucet; and FIG. 4 is another perspective depiction of an alternative embodiment of the invention, in place on a faucet, showing the padlock only in phantom.

The first embodiment 10 of the novel locking means, shown in FIGS. 1, 2 and 3, comprises a locking plate 12 which has, centrally thereof, a tapped hole 14 which extends only approximately half-way into the depth of the plate 12. Seated in the bottom of the hole 14 is an annular seal 16. In addition, the plate 12 has a plurality (eight, in this embodiment) of throughgoing, unthreaded holes 18, the latter being substantially equally spaced apart, about a common radius drawn from the radial center of the tapped hole 14. Holes 18 are spaced apart, substantially by forty-five degrees of arc. Hole 14 and seal 16 are provided to receive the threaded nozzle of a faucet therein and thereagainst, respectively, to firmly close off the faucet, and the purpose of holes 18 is explained in the following text.

An external faucet 20, shown only in phantom, which has an externally-threaded nozzle, is depicted as extending from an outside wall 22 of a residence or storage tank. Its threaded nozzle is made fast in the hole 14, being threadedly engaged therewith, and is sealingly engaged with the seal 16. Consequently, even if the handle 24 of the faucet 20 is turned to an open position, the fluid (water, fuel or the like) can not be drawn.

Now, to prevent an unauthorized party from unscrewing the plate 12 from the faucet 20, in order to draw fluid therefrom, means are provided for the purpose. Observing the disposition of the secured plate 12, one notes which one of the holes 18 is (a) closest to the bonnet, stem and handle of the faucet 20, and (b) would be the first thereof to pass under the bonnet, stem and handle, if the plate 12 were to be unthreaded from the faucet 20. Having so noted, the shackle 26 of an open padlock 28 is passed through the determined hole 18, via the underlying surface of the plate 12, and then the shackle 26 is locked into the body of the padlock. As will be appreciated, then, if one endeavors to unscrew the plate 12 from the faucet 20, the padlock 28 will impact the faucet 20 and prevent removal of the plate 12 from the faucet 20. In that the holes 18 are spaced apart approximately forty-five degrees of arc, the novel locking means insures that the plate 12 can not be unscrewed from the faucet 20 more than one-eighth of a turn.

FIG. 4 depicts an alternative embodiment 10a of the novel locking means, and same or similar index numbers shown thereon signify same or similar components as so indexed in FIGS. 1, 2 and 3.

Embodiment 10a employs a similar plate 12a for threaded engagement thereof with a faucet 20. Again, the critical hole 18, which is (a) closest to the bonnet, stem and handle of the faucet, and (b) would be the first to pass under the bonnet, stem and handle, is determined. Then, a rod 30, having a head 32 and a shank 34 is used to hold the plate 12a in its sealed engagement with the faucet 20. The shank 34 is passed into the critical, determined hole 18, via the bottom surface of the plate 12a, for the head 32 to abut the aforesaid surface. As shown, the shank 34 projects outwardly from the plate 12a, and has a borehole 36 formed therethrough. Now, the shackle 26 of a padlock 28 is secured in the borehole 36, to prevent a withdrawal of the rod 30 from the hole 18 in which it is positioned.

While I have described my invention in connection with specific embodiments thereof, it is to be clearly understood that this is done only by way of example, and not as a limitation to the scope of the invention as set forth in the objects thereof, and in the appended claims.

I claim:

1. A locking means, for a faucet having an externally-threaded nozzle, comprising:
   first means for (a) coupling thereof only to said nozzle of a faucet, (b) threadedly engaging said nozzle, and (c) sealingly closing off said nozzle; and
   second means for (a) coupling thereof only to said first means, (b) lockingly engaging said first means, and (c) prohibiting an uncoupling of said first means from such nozzle; wherein
   said first means comprises a plate having (a) a tapped hole, and (b) a throughgoing, untapped hole, formed therein; the centers of said tapped and untapped holes having parallel axes; and
   said second means comprises (a) a rod, having a head and a shank, and a bore traversing said shank, for penetration of said untapped hole by said shank, and (b) a padlock, having a shackle, for penetration of said bore by said shackle.

2. A locking means for a faucet having an externally-threaded nozzle, comprising:

first means for (a) coupling thereof only to said nozzle of a faucet, (b) threadedly engaging said nozzle, and (c) sealingly closing off said nozzle; and second means for (a) coupling thereof only to said first means, (b) lockingly engaging said first means, and (c) prohibiting an uncoupling of said first means from said nozzle; wherein said first means comprises a plate having (a) a centrally located, tapped hole, and (b) a plurality of throughgoing, untapped holes, formed therein, said plurality of untapped holes being circumjacent said tapped hole; and said untapped holes, relative to the radial center of said tapped hole, are approximately forty-five degrees of arc therebetween.

* * * * *